United States Patent
Drabrin et al.

[11] Patent Number: 5,841,019
[45] Date of Patent: Nov. 24, 1998

[54] METHOD FOR NON-DESTRUCTIVE MEASURING COMPRESSIVE AND TENSILE STRENGTHS OF CONCRETE IN THE STRUCTURE

[76] Inventors: Sergey Drabrin, P.O. Box 240229; Yuriy Boguslavskiy, 2926 W. 25 St. #815 D, both of Brooklyn, N.Y. 11224

[21] Appl. No.: 892,018

[22] Filed: Jul. 14, 1997

[51] Int. Cl.$^6$ ................................................ G01M 7/00
[52] U.S. Cl. .................................... 73/12.11; 73/12.09
[58] Field of Search ............................ 73/12.01, 12.04, 73/12.06, 12.09, 12.13, 78, 79, 82

[56] References Cited

U.S. PATENT DOCUMENTS

| | | | |
|---|---|---|---|
| 3,576,127 | 4/1971 | Weitzel | 73/12.11 |
| 3,879,982 | 4/1975 | Schmidt | 73/12.01 |
| 4,034,603 | 7/1977 | Leeb et al. | 73/12.09 |
| 4,270,383 | 6/1981 | Singer et al. | 73/82 |
| 4,402,210 | 9/1983 | Vandeberg | 73/12.09 |
| 4,470,293 | 9/1984 | Redmon | 73/12 |
| 4,918,988 | 4/1990 | Ebihara et al. | |
| 5,176,026 | 6/1993 | Leeb et al. | 73/79 |
| 5,285,687 | 2/1994 | Ringel et al. | 73/579 |
| 5,311,764 | 5/1994 | Smith et al. | 73/12.04 |
| 5,490,411 | 2/1996 | Hogan | 73/12.13 |

OTHER PUBLICATIONS

CRC Handbook on Nonderstructive Testing of Concrete, Editors Malhotra, V.M. and Carino, N.J., published by CRC Press, Boston in 1991 pp. 1–17.

*Primary Examiner*—Max H. Noori

[57] ABSTRACT

This invention provides a method for direct non-destructive measuring compressive and tensile strengths of materials with negligible viscous properties and more particularly, but not exclusively, concrete, by separately measuring the duration of the compressive phase $t_0 t_1$ of an impact of a body by an impacter and the duration of the rebounding phase $t_1 t_2$ of the impact Where $t_0$ is the time when the impacter initially contacts the body, $t_1$ is the time when the impacter first stops moving and $t_2$ is the time when the impacter loses contact with the body. An important feature of the test is that in the compressive phase of the impact, the body experiences small compressive damage in the contacting areas, thus providing for direct characterization of compressive and tensile strengths similar to conventional destructive testing methods.

11 Claims, 3 Drawing Sheets

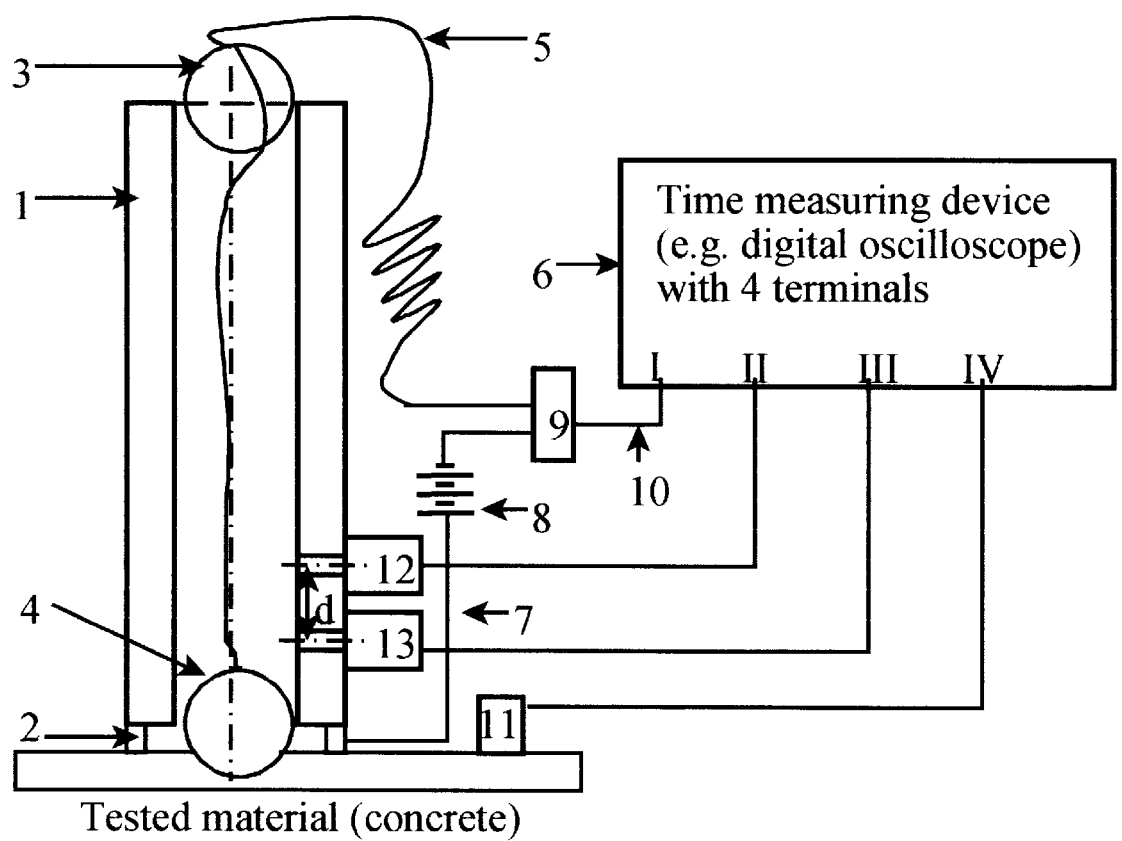

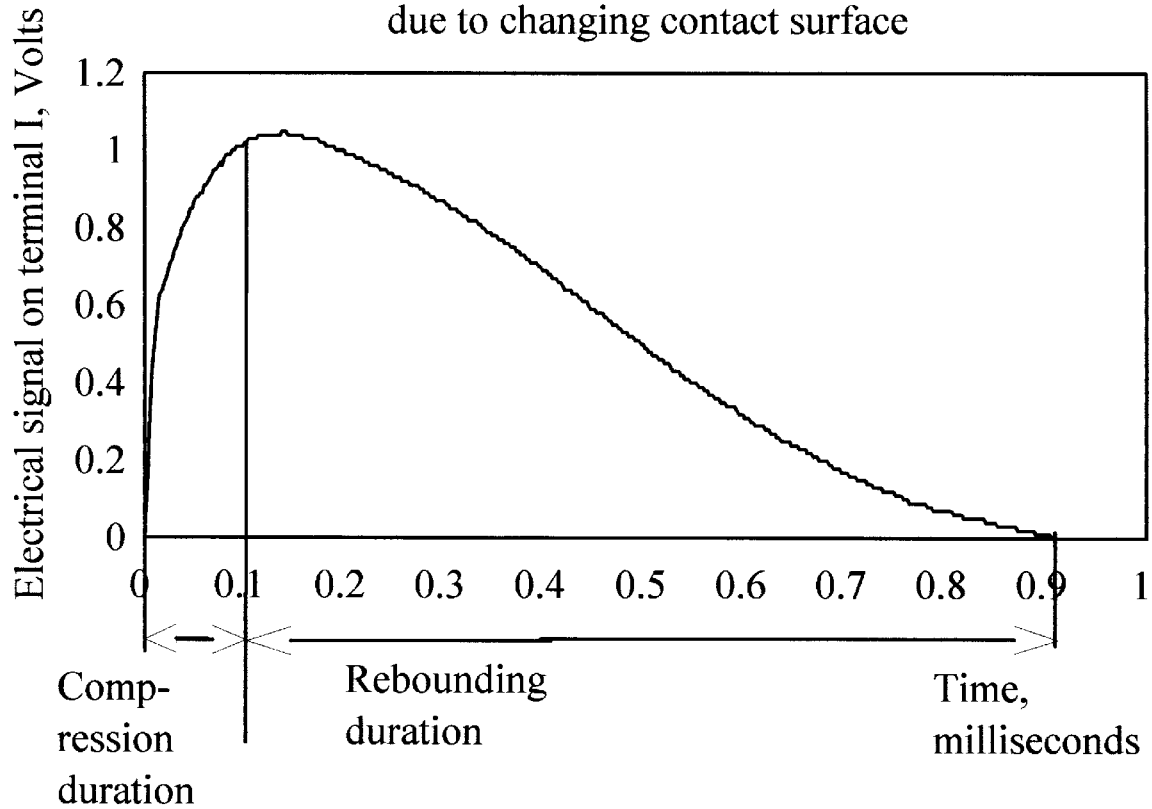

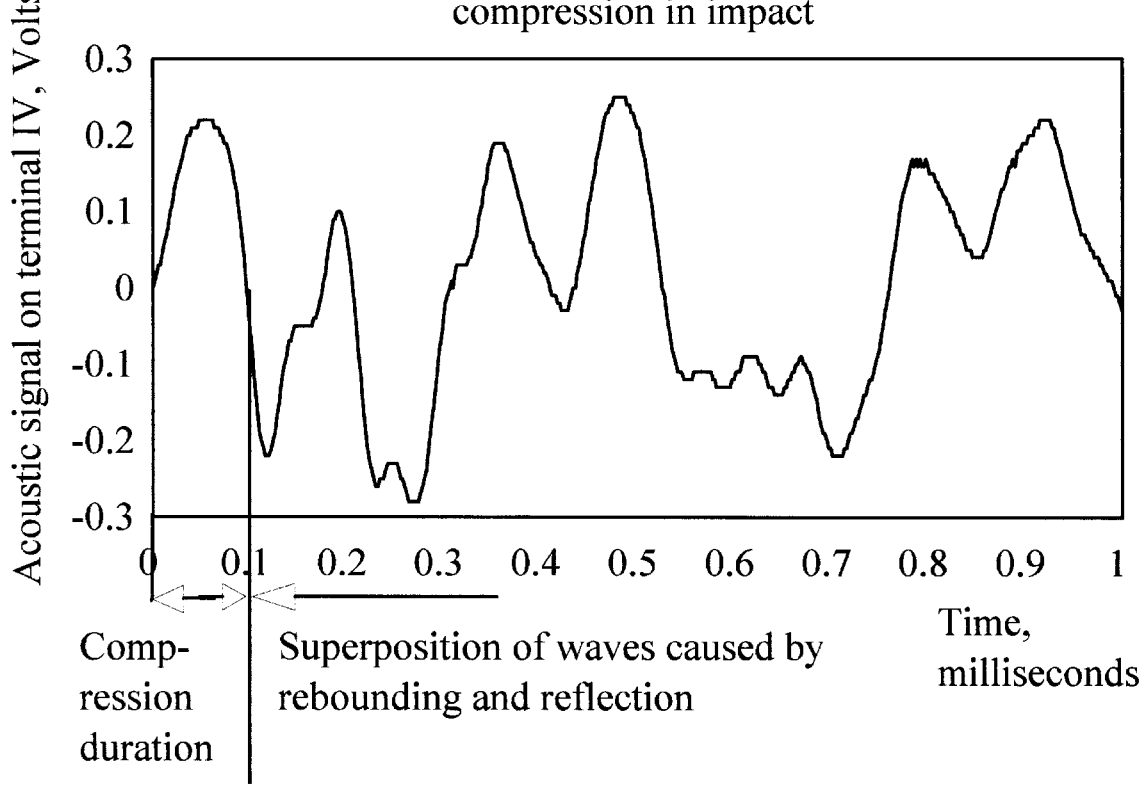

METHOD FOR NON-DESTRUCTIVE MEASURING COMPRESSIVE AND TENSILE STRENGTHS OF CONCRETE IN THE STRUCTURE

TECHNICAL FIELD

This invention relates to the testing of compressive and tensile strengths of materials and more particularly, but not exclusively, concrete by impacting the material with an impacter that rebounds from the material as a result of the impact.

BACKGROUND ART

The strength of concrete is usually determined by destructive tests in which standard control specimens, such as cubes, prisms, or cylinders, are compressed until the specimens' failure which is characterized by the deformation of the specimen until cracks are developed in it. The pressure required to achieve this state of stress is used to characterize the compressive or tensile strength of the material, depending on the mode of loading. The specimens are taken off the batch when the concrete is mixed. These methods, however, indicate only the potential strength of the concrete in question since the curing conditions and the degree of compaction are major factors affecting the strength of concrete and these may be different for the tested specimen and the structure in which the batch of concrete is used.

To measure the strength of concrete in a structure, the specimens for the above mentioned compressive or tensile tests are sometimes cut from the structure itself. This procedure is expensive and it damages the structure thus limiting the number and locations of places where concrete can be tested.

A variety of non-destructive methods are used that relate some physical or mechanical property to the strength of concrete in the structure, e.g., penetration resistance methods; indentation and rebound methods; and ultrasonic methods. Penetration resistance methods determine the depth of the penetration of probes (steel rods or pins) into concrete. The indentation methods consist principally of impacting the surface of concrete by means of a given mass with specific kinetic energy and measuring the width and depth of the resulting indentation on the concrete surface. The rebound methods measure the rebound distance of an impacting body after its impact with the concrete structure. The ultrasonic methods measure certain characteristics of ultrasonic waves propagating in concrete, e.g. velocity or phase. These methods are described, for example, in the *"CRC Handbook on Nondestructive Testing of Concrete", editors Malhotra, V. M. and Carino, N. J., published in* 1991 by CRC Press, Boston.

Other examples of the prior art non-destructive impacting testing of materials in structures follow.

1. A rebound hammer as disclosed in U.S. Pat. No. 5,311,764 (1994) evaluates an analog signal proportional to the maximum rebound of the mass after impacting a concrete structure. The distance of the rebound is correlated to the compressive strength.

2. A testing device for surfaces subject to impact as disclosed in U.S. Pat. No. 5,490,411 (1996) evaluates the peak acceleration upon impact of an impact head on a surface. This output is correlated with the severity of head injury.

3. A process for acoustic examination of monoliths for damage and a device for implementing the process as disclosed in U.S. Pat. No. 5,285,687 (1994) analyzes the frequency distribution of amplitudes of sound waves produced by a hard impacter blow of defined force to a monolith. The result is compared with a reference curve defined for undamaged monoliths.

4. A method of detecting defects in concrete in a building as disclosed in U.S. Pat. No. 4,918,988 (1990) analyzes the attenuation characteristic of sound produced by a hammer tapping the surface of a building. The maximum peak value and/or the integrated value is compared with a reference value.

5. An impacting device for testing insulation as disclosed in U.S. Pat. No. 4,470,293 (1984) by Redmon measures the force of the impact and the duration of the time the hammer head is actually in contact with the insulation. The produced signal is correlated with the quality of the bonding of insulation to metal.

6. A method and apparatus for testing the hardness of specimens as disclosed in U.S. Pat. No. 3,879,982 (1975) by Schmidt measures hardness by measuring different various impact and rebound durations.

All the methods of the foregoing prior art have some utility as non-destructive test devices. A disadvantage of all these methods is that they require empirical correlation for scaling purposes between the results of measurements and measured properties which vary for different conditions. It is especially true for the methods of non-destructive measuring material's strength. For example, the indentation method, when applied to brittle materials can produce small indentation characterizing large strength but cause cracks under the surface; such material tested with conventional destructive compression tests will demonstrate low strength.

The rebound methods do not distinguish the compressive and rebounding phases of an impact, hence the rebounding of the rebound hammer's head to a certain height depends on both compressive and tensile properties of material which vary significantly. Therefore this characterization differs from the conventional process of compressive testing that is not influenced by tensile properties of the specimen's material or tensile testing which is not influenced by compressive properties. Hence, the rebounding height can only be empirically correlated with the material's compressive strength or tensile strength, but it cannot be used for the direct measurement of either.

In particular Redmon (U.S. Pat. No. 4,470,293) discloses the device for testing the quality of bonding of different layers of a layered system. It measures force by using a loadcell mounted on the impacting device as shown on his FIG. 1. More important, his device is measuring the total time during which the impacter, designated as a hammer head, is in contact with the insulation. This method does not permit direct measuring of compressive and tensile strengths of material that require distinguishing of compressive and tensile phases of an impact.

In Schmidt, an impacter strikes a probe that is initially in contact with the body. The hardness of the body is then measured as a function of the total time duration of resulting movement of the probe from the moment of time $t_0$ of the initial contact of the impacter with the probe until the probe has come again into contact with the impacter at time $t^1{}_2$. This $t^1{}_2$ is a moment of time that occurs some time after the probe has first stopped moving ($t_1$), has rebounded, and has again come into contact with the impacter (FIG. 4a to 4d, sheet 3 of Schmidt). Therefore, $t_1 < t^1{}_2 < t_2$ (only inequality signs are valid here), where $t_1$ is the time when the impacter first stops moving, and $t_2$ is the time when the impacter loses contact with the body. Then Schmidt's time duration of measurement is equal to $t_0t^1{}_2$. In particular $t^1{}_2$ is not equal to either $t_1$ or to $t_2$, and, hence, $t_0t^1{}_2$ is not equal to either $t_0t_1$ or $t_1t_2$. Time intervals $t_0t_1$ and $t_1t_2$ characterize, respectively, the compressive and rebounding phases of an impact. Only these phases of an impact can be used for direct measurements of the compressive and tensile strengths of material, hence Schmidt's method has a general disadvantage of all rebound methods being incapable to directly measure the material's strength.

Ultrasonic methods correlate the characteristics of ultrasonic waves in materials with strength. However, these characteristics depend on elastic Young's modulus and they are derived at deformations which are much smaller than deformations causing the material's damage that is necessary for strength measurements.

BRIEF DESCRIPTION OF THE INVENTION

One embodiment of the invention involves a non-destructive measuring compressive and tensile strengths of materials with negligible viscous properties in structures that does not require correlations with other materials for scaling purposes. In order to achieve this objective, an impacter with specific kinetic energy at the time of impact strikes the body. This kinetic energy should be sufficiently large that the body undergoes compressive damage at areas where the impacter strikes the body but not be so large that the damage prevents body from rebounding until the impacter loses contact with the body.

The compressive strength is measured by measuring the duration of the impact's compressive phase (the time interval $t_0t_1$) beginning when the impacter touches the body's surface (time $t_0$) and ending when the impacter first stops moving (time $t_1$). The compressive strength, $S_c$, for a sphere-shaped impacter is calculated as:

$$S_c = \frac{0.2m}{Rt_c^2} \quad (1)$$

where m is the impacter's mass, R is the impacter's radius, and $t_c$ $\beta = t_0t_1$ is the duration of the compressive phase of an impact.

The tensile strength is measured by measuring the duration of the impact's rebounding phase (the time intervals beginning when the impacter first stops moving (time $t_0$) and ending when the impacter is rebounded until it loses contact with the body (time $t_2$). The tensile strength, $S_t$, for a sphere-shaped impacter is calculated as:

$$S_t = \frac{0.2m}{Rt_ct_r} \quad (2)$$

where m is the impacter's mass, R is the impacter's radius, and $t_c$ $\beta = t_0t_1$ and $t_r$ $\beta = t_1t_2$ are the respective durations of the compressive and rebounding phases of the impact.

We have derived formulas (1) and (2) based on the law of conservation of energy as shown in the Addendum. These formulas supply direct measures of compressive and tensile strengths of body's material. Surprisingly, these equations do not involve the measurements of the penetration depth nor the diameter of indentation.

This invention measures the duration of the compressive phase by measuring the electrical signal developed between the impacter and the body and/or by measuring an acoustic compressive wave caused by the impact of the impacter on the body, and by measuring a duration as time between two first consecutive zero levels on a time-amplitude diagram of the compressive wave.

This invention measures the duration of the rebounding phase by measuring the electrical signal developed between the impacter and the body.

BRIEF DESCRIPTION OF THE DRAWINGS

FIG. 1 is a schematic diagram of the invention's embodiment utilizing gravity for supplying the kinetic energy to the impacter.

FIG. 2 is a graph showing the change of an electrical signal between the impacter and concrete body during compressive and rebounding phases of an impact.

FIG. 3 is a graph showing the change of an electrical signal caused by an acoustic wave produced by the impact of the body with the impacter.

DETAILED DESCRIPTION OF INVENTION

This invention provides a method for non-destructive measuring compressive and tensile strengths of materials with negligible viscous properties and more particularly, but not exclusively concrete, by separately measuring the duration of the compressive phase of an impact of a body by an impacter and the duration of the rebounding phase of the impact.

Measuring Compressive Strength

This invention measures the compressive strength of a body by striking it with an impacter having a kinetic energy immediately prior to the impacting. The kinetic energy should be sufficiently large that the body undergoes compressive damage at areas where the impacter strikes the body but not so large that the damage prevents the body from rebounding until the impacter loses contact with the body. This compressive damage is similar to damage produced on a large scale in standard compression testings thus providing for direct characterization of compressive strength. For concrete testing this energy ranges approximately from 0.25 to 0.9 N/m(J).

In the present invention the compressive strength is measured by measuring the duration of the compressive phase (the time interval $t_0t_1$.) of the impact beginning when the impacter touches the surface of the body (time $t_0$)and ending when the impacter first stops moving (time $t_1$). The impacter's material should be much stronger than the body's material, so its deformation during the compressive phase can be neglected in comparison with the local deformation of the body's material, it may be aluminum or steel for the testing of concrete.

The compressive strength, $S_c$, for a sphere-shaped impacter is calculated as:

$$S_c = \frac{0.2m}{Rt_c^2} \quad (1)$$

where m is the impacter's mass, R is the impacter's radius, and $t_c$ $\beta = t_0t_1$ is the duration of the compressive phase of an impact. We have developed formula (1) based on the law of conservation of energy as shown in the Addendum. This formula supplies the direct measure of the compressive strength of the body. The size of the body's zone experiencing the compressive damage is negligibly small in comparison with the body's size and therefore, the invention constitutes a non-destructive testing method.

In FIG. 1 the kinetic energy is supplied to the impacter by gravity during its fall through the guiding system (1, 2) from an initial position 3 to the position 4 where it impacts the body. The guiding system should not interfere with the impacter's fall. This method is applicable for testing horizontal structures. When the orientation of a structure differs from horizontal, the kinetic energy may be supplied to the impacter by any other source of energy including but not limited to spring, pneumatic, or gunpowder.

Considering the necessity to supply the impacter with the specific kinetic energy, this energy is measured by measuring the time increment that the impacter produces by consecutively switching optical transducers 12 and 13 installed near the place of the impact. For connecting sensors 12 and 13 optically with the interior of guiding system 1, two holes are drilled in it as shown in FIG. 1. When the front of the impacter appears before sensor 12, it sends an electrical signal to terminal II of the time measuring device (e.g., digital oscilloscope) 6 which registers time t1. Then the front of the impacter appears before sensor 13 which sends an electrical signal to terminal III of device 6. Then the velocity, v, of the impacter prior to the impact is calculated considering the distance, d, between the sensors 12 and 13 as $$\frac{d}{t2-t1}.$$

The kinetic energy of the impacter is then calculated as $$\frac{mv^2}{2}.$$

For example, to measure the strength of concrete, the specified kinetic energy has an aluminum sphere-shaped impacter with the radius, R, of 12.7 mm and mass, m, of 0.024 kg moving with the velocity ranged from 4.6 to 8.7 m/sec. For testing horizontal concrete structures, sufficient kinetic energy is provided by the guiding system with the length of 1 m.

Two methods for measuring the duration of the compressive phase of an impact are disclosed here. Both methods can be used simultaneously for verification purposes or separately. The first method measures the duration of the compressive phase by measuring the amplitude change of electrical signal developed between the impacter and the body. For this part 1 of the guiding system is made of electrically non-conducting material; part 2 of the guiding system and the impacter is made of electrically conducting material. The guiding system touches a body with its conducting part 2. The impacter is operably connected to a pole of an input terminal of an amplifier 9 by an electrically conductive cord 5. Cord 5 is fastened to the impacting body at a point close to the axis of the guiding system 1 so as to provide at most a minimum amount of disturbance to the impacter's fall. Also for that reason, the cord is made of coiled cord which expands easily without significant pull on the impacter. The conducting part 2 is connected via an electrical wire 7 to one terminal of a battery 8; the other terminal of battery 8 is connected via an electrical wire to the second pole of the input terminal of amplifier 9. The output terminal of amplifier 9 is connected via electrical cable 10 to terminal I of device 6. When the impacter is at its initial position 3 and during its fall through the guiding system but prior to the contact with the material inside part 2, electrical resistance between the impacter and part 2 is very large because air and part 1 is electrically non-conducting, thus electrical current does not go through the electrical circuit that includes terminal I of device 6, electrical cable 10, output terminal of the amplifier 9, an input pole of the terminal of the amplifier 9, cord 5, the impacter, the body inside part 2, part 2, wire 7, battery 8, the second pole of the input terminal of the amplifier 9, the electrical cable 10, and the terminal I of device 6. Therefore, the electrical signal on terminal I of 6 is equal to zero. When the impacter touches the body, the compressive phase begins (time $t_0$). The electrical resistance between the impacter and part 2 decreases proportional to increasing contacting surface between the impacter and the body, thus the electrical current through the electrical circuit increases the electrical signal on terminal I of 6. When the impacter first stops moving, the electrical signal becomes approximately constant thus constituting the end of the compressive phase (time $t_1$). This increase of electrical signal is shown in FIG. 2 as a time-amplitude graph produced by an impact of the aluminum sphere with the diameter of 0.0254 m and mass of 0.024 kg. The duration of compressive phase, $t_c$, is equal to 0.10±0.005 millisecond. The concrete's compressive strength computed with formula (1) is approximately 37.8× $10^6$ N/m² (5500 psi) which matched concrete's compressive strength measured with the conventional destructive compression method.

The second method measures the duration of the compressive phase by measuring an acoustic compressive wave caused by the impact of the impacter on the body, and by measuring a duration as the time intervals between two first two consecutive zero levels on a time-amplitude diagram of the compressive wave as shown in FIG. 3. For measuring the acoustic wave, an acoustic transducer (e.g., microphone) 11 in FIG. 1 is placed close to the place of impact at a distance less than twice the distance to any boundary of the tested structure to avoid the influence of acoustic signals reflected from the body's boundaries. At the beginning of the compressive phase, (time $t_1$) the particles of the body start moving away from the impacter, which is accompanied by an increase of the amplitude of the compressive wave which is transformed by the transducer 11 in the increasing electric signal on the terminal IV of device 6. The compressive phase (time $t_0$) ends when the compressing movement of the impacter and corresponding movement of body's particles ceases. This causes the decrease of amplitude of the compressive wave to zero level (time $t_1$). For the same conditions as were discussed in the previous example, the duration of the compressive phase, $t_c$, is equal to 0.10±0.005 msec which is approximately equal to the duration of the compressive phase measured with the first method. In this example, both methods were used simultaneously.

Measuring Tensile Strength

This invention measures the tensile strength of a body by striking it with an impacter having a kinetic energy immediately prior to the impacting. The kinetic energy should be sufficiently large that the body undergoes compressive damage at areas where the impacter strikes the body, but not so large that the damage prevents body from rebounding until the impacter loses contact with the body. For concrete testing this energy ranges approximately from 0.25 to 0.9 N/m (J). The tensile strength is measured by measuring the duration of the rebounding phase (the time interval $t_1 t_2$) of the impact beginning when the compression of the body by the impacter stops and ending when the rebounded impacter loses contact with the body. The tensile strength, $S_t$, for a sphere-shaped impacter is calculated as:

$$S_t = \frac{0.2m}{Rt_c t_r} \quad (2)$$

where m is the impacter's mass, R is the impacter's radius, and $t_c = t_0 t_1$ and $t_r = t_1 t_2$ are the respective durations of the compressive and rebounding phases of the impact. We have derived formula (2) based on the law of conservation of energy as shown in the Addendum. This formula supplies direct measure of tensile strength of the body.

The duration of the rebounding phase is measured by measuring the electrical signal developed between the impacter and the body. This electrical signal is caused by changing resistance the between the impacter and the body during impacter's rebounding from position 4 in FIG. 1 until the impacter loses contact with the body. At the beginning of the rebounding phase, (time $t_1$) electrical current is approximately constant through the electrical circuit including terminal I of device 6, electrical cable 10, output terminal of amplifier 9, an input pole of the terminal of amplifier 9, cord 5, the impacter, the body inside part 2, part 2, wire 7, battery 8, the second pole of the input terminal of amplifier 9, electrical cable 10, and terminal I of device 6. When the impacter is rebounded, the electrical resistance between the impacter and part 2 increases proportionally to the decreasing contacting surface between the impacter and the body, thus the electrical current through the electrical circuit decreases the electrical signal on terminal I of 6. When the impacter loses contact with the body, the electrical signal becomes equal to zero thus constituting the end of the tensile phase (time $t_2$).

The time-amplitude graph of the rebounding phase of the impact of the aluminum sphere with the diameter of 0.0254 m and mass of 0.024 kg upon concrete is shown in FIG. 2. The duration of the rebounding phase, $t_r$, is equal to 0.80±0.005 msec. Concrete's tensile strength computed with formula (2) is approximately $4.7 \times 10^6$ N/m$^2$ (690 psi) which matched the concrete's tensile strength measured with conventional destructive split-cylinder test.

The present invention has been more particularly described with reference to testing the compressive and tensile strength of concrete in structures since it was for this purpose that the invention was initially developed. However, the invention is not intended to be construed as limited to such testing. The invention can clearly be applied to other brittle materials, and examples in this connection are natural rocks which can be tested for the design of foundations and testing of ceramics.

ADDENDUM
Derivation of Formula for Calculating the Compressive Strength

The formula for calculating the compressive strength of a body is derived for an impact of a non-deforming, sphere-shaped impacter on the plain surface of the body that results in compressive damage at areas where the impacter strikes the body. However, the damage must not be so significant as to prevent the body from rebounding the impacter until it loses contact with the body.

An impact of a rigid sphere with the radius, R, mass, m, and velocity, v, immediately prior to the impact results in its penetration into the body to depth, h, because the body experienced local damage in the impact's area. The body in the state of finite compressive deformations exceeding elastic deformations can be characterized with its secant modulus, $E_{eff}$, as is done for slow compressive loading, for example, in Wang, C. K. and Salmon C. G., "*Reinforced Concrete Design*", Harper Collins Publishers Inc., 1992. We here derive $E_{eff}$ for the impact.

When the velocity, v, is much smaller than the sound velocity in the body, the energy balance of the impact can be presented by the following formula:
ti $U_1+U_2+U_3=U_4$+tm (A.1)

where $U_1$ is the kinetic energy of the penetrating sphere; $U_2$ is the potential energy of the body in the state of finite compressive deformations; $U_3$ is the energy loss caused by the development of microcracks and minor plastic deformations of the material of the body in the zone of the impact; and $U_4$ is the kinetic energy of the sphere immediately prior to the impact. The energy $U_1$ can be expressed as $$\frac{m\dot{h}^2}{2}.$$

The energy $U_2$ is equal to $\frac{1}{2}E_{eff}R^{3-n}h^n$ as follows from the dimensional analysis (see, for example Sedov, L. L, 1959, *Similarity and Dimensional Method as in Mechanics*, New York, Academic Press), the value of the dimensionless coefficient n is defined later. The energy $U_3$ depends on the velocity, v, but not on h, hence $U_3=U_3(v)$. The energy $U_4$ is equal to $$\frac{mv^2}{2}.$$

Therefore, formula (A.1) becomes:

$$\frac{m\dot{h}^2}{2} + \frac{1}{2} E_{eff}R^{3-n}h^n + U_3(v) = \frac{mv^2}{2} \quad (A.2)$$

At very small velocities, v, the impact causes no damage to the body and no microcracks are developed; in that case $U_3$ is equal to 0, and the body's deformation follows Hooke's law. In that case, the secant modulus $E_{eff}$ is approximately equal to Young's modulus, E, the value of n=2.5, and formula (A.2) converges to the form known, e.g. from Landau, L. D. and Lifshitz, E. M. "*Theory of Elasticity*", Vol. 7, Pergamon Press, 1970.

For the impact discussed in this invention, the maximal depth of the impacter's penetrating in the body, $h_m$, is derived from formula (A.2) as:

$$h_m = \left( \frac{v^2 - \frac{2U_3}{3}}{\gamma_0} \right)^{\frac{1}{n}} \quad (A.3)$$

where $$\gamma_0 = \frac{E_{eff}R^{3-n}}{m}$$

The duration of the compressive phase of the impact, $t_c$, is derived by integrating (A.2) as:

$$t_c = \frac{\sqrt{\pi}}{n} \frac{\Gamma\left(\frac{1}{n}\right)}{\Gamma\left(\frac{2+n}{2n}\right)} \frac{\left(v^2 - \frac{2U_3}{m}\right)^{\frac{2-n}{2n}}}{\gamma_0^{\frac{1}{n}}} \quad (A.4)$$

where $$\Gamma\left(\frac{1}{n}\right) \text{ and } \Gamma\left(\frac{2+n}{2n}\right)$$

are Euler's Gamma functions (e.g., Korn, G. and Korn, T, "*Mathematical Handbook for Scientist and Engineers*, McGraw-Hill Book Co., New York, 1968). From formulas (A.3) and (A.4) it follows that $$E_{eff} = \left( \frac{\sqrt{\pi}}{n} \frac{\Gamma\left(\frac{1}{n}\right)}{\Gamma\left(\frac{2+n}{2n}\right)} \right)^n mR^{n-3}t_c^{-n}\left(v^2 - \frac{2U_3}{m}\right)^{\frac{2-n}{2}} \quad (A.5)$$

Substituting (A.5) in (A.3), $h_m$ can be derived as:

$$h_m = \frac{n}{\sqrt{\pi}} \frac{\Gamma\left(\frac{2+n}{2n}\right)}{\Gamma\left(\frac{1}{n}\right)} \left(v^2 - \frac{2U_3}{m}\right)^{\frac{1}{2}} t_c \quad (A.6)$$

Compressing force, $F_m$, required to reach $h=h_m$ is:

$$F_m = \frac{\partial U_2}{\partial h}\bigg|_{h_m} = \frac{n}{2} E_{eff} R^{(3-n)} h_m^{n-1} \quad (A.7)$$

The pressure of the spherical sector of the impacter at the area of the impact, $P_m$, is approximately $$P_m = \frac{F_m}{2\pi R h_m} = \frac{n}{4\pi} E_{eff} R^{(2-n)} h_m^{n-2} \quad (A.8)$$

for $h=h_m \ll R$. Considering formulas (A.5) and (A.6), the pressure, $P_m$, from formula (A.8) becomes $$P_m = \frac{n}{4\pi} \left( \frac{\sqrt{\pi}}{n} \frac{\Gamma\left(\frac{1}{n}\right)}{\Gamma\left(\frac{2+n}{2n}\right)} \right)^2 mR^{-1}t_c^{-2} \quad (A.9)$$

When the energy loss, $U_3$, increases to its maximal value equal to $$\frac{mv^2}{2},$$

it follows from formula (A.6) that for constant value of $t_c$ the penetration depth of the impacter approaches zero, which is impossible. Therefore, the value of $t_c$ must increase with increasing $U_3$, and $t_c$ approaches infinity when $$U_3 \rightarrow \frac{mv^2}{2}.$$

Simultaneously, when $t_c$ approaches infinity, the pressure $P_m$ approaches zero. Hence, the compressive strength of the body, $S_c$, is approximately equal to $P_m/2$, which is the average of $P_m$ from formula (A.9) and zero.

In this invention, we simplified formula (A.9) considering the following. Our experiments showed that the values of n are greater than one. These experiments were performed by the loading of concrete samples in a conventional material testing system with the same sphere that was used as the impacter in the invention. For the same depths $h_m$ of sphere's penetration in the concrete that are achieved by the impacter in the invention, the values of $P_m$ and $E_{eff}$ were measured, and the values of n were calculated with formula (A.8). As was explained earlier, n cannot exceed 2.5. Calculated with formula (A.9), $P_m$ is equal to $0.43R^{-1}mt_c^{-2}$ for $n=2.5$, and $P_m$ is equal to $0.32R^{-1}mt_c^{-2}$ for $n=1$. Hence, 2.5 times change of n causes only 30% change of $P_m$. For practical considerations, it can be assumed that $P_m$ is independent of n, and $P_m$ is $$P_m = 0.4mR^{-1}t_c^{-2} \quad (A.10)$$

which gives the invention formula (1) for calculating the compressive strength:

$$S_c = \frac{0.2m}{Rt_c^2} \quad (1)$$

Surprisingly, this formula does not have the terms including energy loss $U_3$ nor penetration depth $h_m$ because the necessary information about the compressive strength gives the duration of the compression of the body by the impacter.

Derivation of Formula for Calculating the Tensile Strength

The formula for calculating the tensile strength of a body is derived for an impact of a non-deforming, sphere-shaped impacter on the plain surface of the body that results in compressive damage at areas where the impacter strikes the body. However, the damage must not be so significant as to prevent the body from rebounding the impacter until it loses contact with the body.

An impact without energy loss (elastic impact) is characterized with equal durations of the compressive and rebounding phases. The impact in the invention results in compressive damage at areas where the impacter strikes the body, and hence, the duration of the rebounding phase always exceeds the duration of the compressive phase. That means that the tensile pressure developed in the rebounding phase, $\tilde{P}_m$, and the tensile strength, $S_t$, differ from the corresponding values of $P_m$ and $S_c$ in the compressive phase.

The law of conservation of energy for the rebounding can be presented in a form similar to (A.1):

$$\tilde{U}_1 + \tilde{U}_2 + \tilde{U}_3 = \tilde{U}_4 \quad (A.11)$$

where $\tilde{U}_1$ is the kinetic energy of the rebounding sphere; $\tilde{U}_2$ is the potential energy of the body in the state of finite tensile deformations; $\tilde{U}_3$ is the energy loss in the rebounding phase; and $\tilde{U}_4$ is the potential energy of the body immediately prior to the rebounding. The energy $\tilde{U}_1$ can be expressed as $$\frac{m\dot{h}^2}{2}.$$

The energy $\tilde{U}_2$ is equal to $\frac{1}{2}\tilde{E}_{eff} R^{3-n^\circ} h^{n^\circ}$ as follows from the dimensional analysis, $\tilde{E}_{eff}$ is the secant modulus of the body in the state of finite tensile deformations exceeding elastic deformations. The energy $\tilde{U}_4$ is equal to $\frac{1}{2}\tilde{E}_{eff} R^{3-n} h_m^n$. Therefore, formula (A.11) becomes:

$$\frac{m\dot{h}^2}{2} + \frac{1}{2}\tilde{E}_{eff} R^{3-n_o} h^{n_o} + \tilde{U}_3(v) = \frac{1}{2} \tilde{E}_{eff} R^{3-n} h_m^n \quad (A.12)$$

By integrating formula (A.12), the pressure, $\tilde{P}_m$, can be derived as:

$$\tilde{P}_m = \frac{n_o}{4\pi} \left( \frac{\sqrt{\pi}}{n_o} \frac{\Gamma\left(\frac{1}{n_o}\right)}{\Gamma\left(\frac{2+n_o}{2n_o}\right)} \right)^{n_o} \left( \frac{\sqrt{\pi}}{n} \frac{\Gamma\left(\frac{1}{n}\right)}{\Gamma\left(\frac{2+n}{2n}\right)} \right)^{2-n_o} m\left(\frac{t_c}{t_r}\right)^{n_o} R^{-1}t_c^{-2}\left(\frac{L}{\tilde{L}}\right)^{\frac{n_o-2}{2}} \quad (A.13)$$

where $t_r$ is the duration of the rebounding; $L=mv^2-2U_3$; and $\tilde{L}=\tilde{E}_{eff}R^{3-n}h_m{}^n-2\tilde{U}_3$.

For an elastic impact, the durations of the compressive and rebounding phases are equal, $t_c=t_r$, and formula (A.13) gives $\tilde{P}_m=P_m$. When the impacter strikes sand, the rebounding time $t_r$ approaches infinity, and $\tilde{P}_m$ becomes equal to zero, but $P_m$ does not.

For practical applications in this invention, we simplified formula (A.13) as we did formula (A.9), so $\tilde{P}_m$ is approximately:

$$\tilde{P}_m = 0.4mR^{-1}t_c^{-1}t_r^{-1} \tag{A.14}$$

$$S_t = \frac{0.2m}{Rt_c t_r} \tag{2}$$

which gives the invention formula (2) for calculating the compressive strength:

Conclusion (a) This analysis demonstrates that for measuring the compressive and the tensile strengths of the bodies the compressive and the rebounding phases should be considered separately.

(b) The compressive strength can be calculated using the duration of the compressive phase.

(c) The tensile strength can be calculated using durations of the compressive and rebounding phases.

(d) The validity of formulas (1) and (2) was confirmed by many tests.

(e) The characterization of the compressive strength of concrete and other non-viscous materials that do not distinguish the compressive and rebounding phases of the impact or use the total time of the contact of the impacter with the body, as is done in prior art, cannot be used for direct measurements of strength. These methods require empirical correlation for scaling purposes between the results of measurements and measured properties which vary for different conditions.

What is claimed is:

1. A non-destructive method for measuring the compressive strength of a body constituting the resistance of the body to finite compressive deformations exceeding an elastic recoverable compressive deformation and comprising:

(a) impacting the body with an impacter having a kinetic energy immediately prior to the impacting, the kinetic energy being sufficiently large that the body undergoes compressive damage at areas where the impacter strikes the body but not be so large that the damage prevents the body from such rebounding that the impacter loses contact with the body; wherein said impacting provides pressure to said body resulting in finite compressive deformation in the impact area exceeding elastic recoverable deformation;

(b) measuring the resistance of said body to said impacting compressive deformation constituting a compressive strength of said body by measuring the duration of the compressive phase of the impact; said duration of compressive phase being the time interval that begins when the impacter touches the surface of the body and ends when the compression of the body by the impacter stops.

2. A non-destructive method for measuring the tensile strength of a body constituting the resistance of the body to finite tensile deformations exceeding an elastic recoverable tensile deformation and comprising: p1 (a) impacting the body with an impacter having a kinetic energy immediately prior to the impacting, the kinetic energy being sufficiently large that the body undergoes compressive damage at areas where the impacter strikes the body but not be so large that the damage prevents the body from such rebounding that the impacter loses contact with the body; wherein said rebounding provides tension to said body resulting in finite tensile deformation in the impact area exceeding elastic recoverable deformation;

(b) measuring the resistance of said body to said rebounding tensile deformation constituting the tensile strength of said body by measuring the duration of the rebounding phase of the impact; said duration of rebounding phase being the interval that begins when the compression of the body by the impacter stops and ends when the rebounded impacter loses contact with the body.

3. A non-destructive method for measuring the compressive and tensile strengths of a body in one act of the impact as recited in claims 1 or 2 and comprising:

(a) impacting the body with an impacter having a kinetic energy immediately prior to the impacting, the kinetic energy being sufficiently large that the body undergoes compressive damage at areas where the impacter strikes the body but not be so large that the damage prevents the body from such rebounding that the impacter loses contact with the body; wherein said impacting provides pressure to said body resulting in finite compressive deformation in the impact area exceeding elastic recoverable deformation in the compressive phase of the impact and said rebounding provides tension to said body resulting in finite tensile deformation in the impact area exceeding elastic recoverable deformation;

(b) measuring the resistance of said body to this impacting compressive deformations constituting the compressive strength of said body by measuring the duration of the compressive phase of the impact; said duration of compressive phase being the time interval that begins when the impacter touches the surface of the body and ends when the compression of the body by the impacter stops;

(c) measuring the resistance of said body to said rebounding tensile deformation constituting the tensile strength of the body by measuring the duration of the rebounding phase of the impact; said duration of rebounding phase being the time interval that begins when the compression of the body by the impacter stops and ends when the rebounded impacter loses contact with the body.

4. The steps recited in claim 1 followed by the step of calculation of the compressive strength, $S_c$, for a sphere-shaped impacter as:

$$S_c = \frac{0.2m}{Rt_c^2}$$

where m is the mass and R is the radius of the impacter, and $t_c$ is the duration of the compressive phase.

5. The steps recited in claim 3 followed by the step of calculation of the tensile strength, $S_t$, for a sphere-shaped impacter as:

$$S_t = \frac{0.2m}{Rt_c t_r}$$

where m is the mass and R is the radius of the impacter, and $t_c$ and $t_r$ are respective durations of the compressive and rebounding phase.

6. The steps recited in claim 3 followed by the steps of calculation of the compressive strength, $S_c$, and tensile strength, $S_t$, for a sphere-shaped impacter as recited in claims 4 and 5, respectively.

7. The method of claim 1 wherein said duration of said compressive phase is measured by measuring the electrical signal developed between the impacter and the body.

8. The method of claim 1 comprising measuring an electrical signal produced in said body by compressive wave caused by the impact of said impacter on said body, wherein said duration of said compressive phase being the time interval on the time-amplitude diagram of said electrical signal that begins when said amplitude first becomes different from zero and ends when said amplitude again becomes equal to zero.

9. The method of claim 2 wherein said duration of said rebounding phase is measured by measuring the electrical signal developed between the impacter and the body.

10. The method of claim 7 comprising:

(c)] measuring said duration of said compressive phase by measuring the amplitude of the electrical signal caused by changing of resistance between the impacter and the body, wherein said duration being the time interval that begins when the signal's amplitude just becomes different from zero and ends when this amplitude becomes approximately constant.

11. The method of claim 9 comprising:

measuring the duration of said rebounding phase by measuring the amplitude of said electrical signal caused by changing of resistance between the impacter and the body due to rebounding of the impacter by the body, wherein said duration being the time interval that begins when said amplitude just becomes approximately constant due to end of compressive phase of the impact and ends when the amplitude becomes equal to zero.

* * * * *

UNITED STATES PATENT AND TRADEMARK OFFICE
CERTIFICATE OF CORRECTION

PATENT NO. : 5,841,019
DATED : November 24, 1998
INVENTOR(S) : Sergey Drabkin and Yuriy Boguslavskiy It is certified that error appears in the above-identified patent and that said Letters Patent is hereby corrected as shown below:

On the title page, item [19] and item [76],
Change "Drabrin et al." to — Drabkin et al.

Inventors:
Change "Drabrin" to — Drabkin

Title page, item [57],
In the Abstract, line 7 change "Where" to — where

Column 3, lines 41 and 53 change printed to correct as follows:

| Place | Printed | Correct |
|---|---|---|
| Column 3, line 41 | $t_c\beta=t_0t_1$ | $t_c=t_0t_1$ |
| Column 3, line 53 | $t_c\beta=t_0t_1$ | $t_c=t_0t_1$ |
| Column 3, line 53 | $t_r\beta=t_1t_2$ | $t_r=t_1t_2$ |

Column 3, line 44 change "(the time intervals" to —(the time interval $t_1t_2$)

UNITED STATES PATENT AND TRADEMARK OFFICE
CERTIFICATE OF CORRECTION

PATENT NO. : 5,841,019
DATED : November 24, 1998
INVENTOR(S) : Sergey Drabkin and Yuriy Boguslavskiy It is certified that error appears in the above-identified patent and that said Letters Patent is hereby corrected as shown below:

Column 6, line 30 change "$t_1$" to —$t_0$

Column 6, line 35 delete "(time $t_0$)"

Column 6, line 63 change "$t_c\underline{u}=t_0t_1$ and $t_r\underline{u}=t_{r1}t_2$" to — $t_c=t_0t_1$ and $t_r=t_1t_2$ Column 11, line 64 delete "p1"

Signed and Sealed this

Sixteenth Day of March, 1999

Attest:

Q. TODD DICKINSON

Attesting Officer

Acting Commissioner of Patents and Trademarks